April 16, 1929.  H. H. FLEMING  1,709,257

STORAGE TANK

Filed May 1, 1925

INVENTOR.
Hart H. Fleming
BY
Fay, Oberlin & Fay
ATTORNEYS.

Patented Apr. 16, 1929.

1,709,257

UNITED STATES PATENT OFFICE.

HART H. FLEMING, OF CLEVELAND, OHIO.

STORAGE TANK.

Application filed May 1, 1925. Serial No. 27,151.

The present invention relates to tanks for the storage of fluids and more particularly to the storage of volatile liquids such as oils, gasoline and the like. Objects of the invention are the provision of means for preventing the vaporization and consequent loss of the volatile liquids and also to reduce the liability of fire in the storage of all fluids. Provision is made for covering the top of the tank or receptacle with a sealing liquid and for maintaining a supply of the same within the tank; the two bodies of sealing liquid being in communication so as to automatically compensate for expansion and contraction of the stored fluids. To the accomplishment of the foregoing and related ends, said invention, then, consists of the means hereinafter fully described and particularly pointed out in the claims.

The annexed drawing and the following description set forth in detail certain means and one mode of carrying out the invention, such disclosed means and mode illustrating, however, but one of various ways in which the principle of the invention may be used.

In said annexed drawing:—

Figure 2:
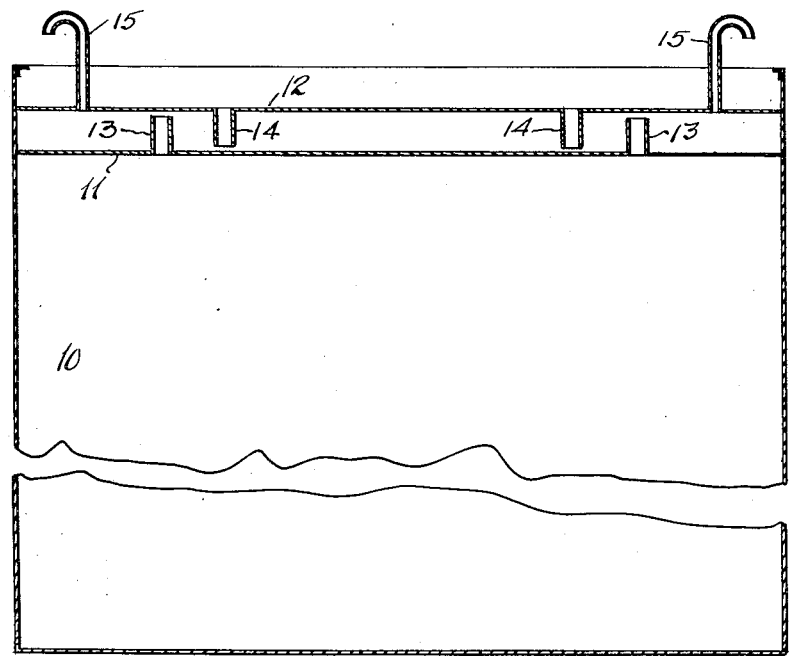
Figure 1:
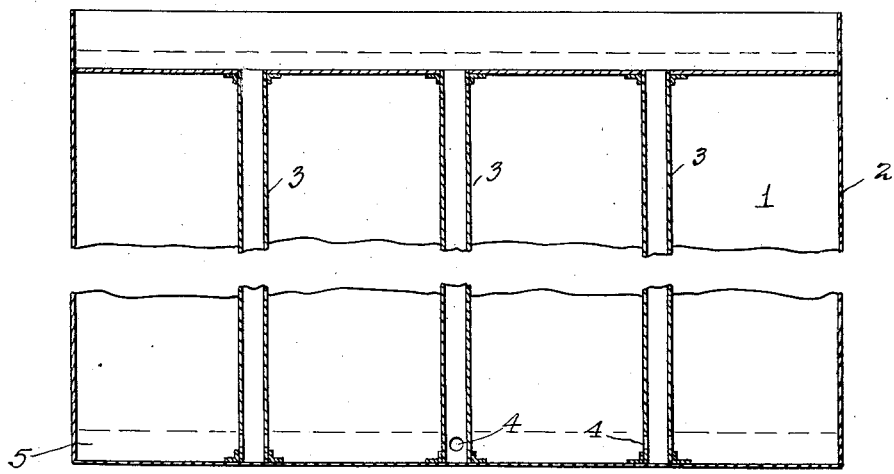

Fig. 1 is a diagrammatic sectional view through a tank embodying the invention and Fig. 2 is a similar view showing a modified form of the invention.

In the present construction, the tank or receptacle when filled has no vapor space and consequently evaporation is eliminated and fire and explosion hazard is materially reduced but the tank still allows free expansion and contraction of the stored liquid. In Fig. 1, there is shown an oil storage tank or receptacle 1 having its side wall 2 extending above the top of the tank to form a receptacle for the sealing liquid which is employed. In the usual case, the sealing liquid will be water but any non-inflammable liquid which is heavier than the fluid to be stored may be substituted in place thereof. From the top of the tank is mounted a water tube 3 extending to the bottom thereof and having an opening 4 adjacent its lower end. In Fig. 1 of the drawings a plurality of such tubes 3 are shown, these being attached to both the top and bottom of the tank and serving as tie rods therebetween, it being understood that a single tube of the required size may be employed and tie rods of any suitable nature used in place of the series of tubes if this is desirable.

A quantity of the sealing liquid 5 is placed in the tank and then the fluid to be stored is forced into the tank until a portion of the sealing liquid is displaced upwardly through the connecting tube until it flows out and covers the tank top to the desired depth. The area of the connecting tube or tubes must be sufficient to allow the sealing liquid and air in the tank to escape as fast as the stored fluid is forced into the tank through the intake port or valve.

When the tank is filled, there is a layer of sealing liquid both on the tank top and at the bottom thereof, such layers being in open communication through the tubes 3. Expansion of the stored liquid under heat will accordingly force more of the sealing liquid up through the tubes 3 and onto the tank top and will decrease the amount of sealing liquid at the bottom of the tank. Contraction of the stored fluid will allow some of the sealing liquid to flow back into the tank and thus the tank itself is always kept full of liquid eliminating open surface for vaporization of the stored liquid and the consequent loss of the stored vapor. This also substantially eliminates the danger of explosion and reduces the fire hazard.

In this form a column of sealing liquid in the vertical tubes exerts an upward pressure on the tank top and the use of a plurality of tubes or tension tie rods is preferable, particularly in large tank size. The depth of sealing liquid on the tank top and in the tank is readily determined so as to provide a sufficient quantity of sealing liquid both in the tank and on the top of the tank at both extremes of temperature which the tank will meet in use.

In the second form as shown in Fig. 2, provision has been made to reduce the pressure due to the column of sealing liquid and as shown, the tank 10 is formed with a false top 11 and an outer top 12, sufficient space being provided to receive the necessary supply of sealing liquid therebetween to satisfy operating conditions under both temperature extremes. On the false top are one or more upwardly extending pipes 13 which reach nearly to the upper top or cover 12 and this top 12 has a series of downwardly extending pipes 14 which reach nearly to the false top 11. From the upper cover extend one or more vent pipes 15 which are similar to the vent pipes shown in Fig. 1.

In this form, the layer of sealing liquid is placed on the false top 11 and as the liquid in the tank expands under heat, it will rise to the pipes 13 displacing some of the sealing liquid through the pipes 14 onto the upper tank top 12. The column of sealing liquid is so short in this form that the pressure generated is practically negligible. In cold weather the sealing liquid would be between the two tank tops and would normally be covered by a layer of the stored liquid which would be the stored liquid of the highest temperature. In this manner the sealing liquid would be prevented from freezing until the entire contents of the tank is reduced to the freezing temperature.

The open space on the tank top or roof for the sealing liquid is the preferable manner of using the present invention but any suitable type of compartment or receptacle may be employed to hold the sealing liquid which is displaced from the tank proper, it being merely necessary to furnish a storage space above the level of the top of the tank into which the sealing liquid may be displaced and from which it will return by gravity to the tank when the stored liquid reduces in volume.

In both forms, the operation is entirely automatic, the stored liquid displacing the sealing liquid and forcing it out onto the tank top or roof which reduces the fire hazard to a minimum. The space between the two tops or covers will be sufficient to compensate for the temperature extremes which are to be met are in the first form, the body of sealing liquid originally placed in the tank and the capacity of the roof or other storage compartment will be sufficient to meet temperature conditions. Thus the present construction provides a storage tank without either a vapor space or moving parts but one which will allow the tank to remain filled regardless of changes in temperature and also allows the free expansion and contraction of the stored fluids. The stored liquids or fluids are also maintained at substantially atmospheric pressure regardless of changes of volume due to temperature changes.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. A storage tank for volatile liquids, comprising a receptacle having its walls extending above its top forming an upper liquid pan, a false top in said receptacle forming a compartment, passages from the lower portion of said compartment to said open pan and other passages from the main receptacle to the top of said compartment.

2. A storage tank for volatile liquids, comprising a receptacle having its walls extending above its top forming an open upper liquid pan, a false top in said receptacle forming a compartment, tubes mounted in said top and forming open communication from said pan to the bottom of said compartment, and other tubes mounted in said false top and extending upwardly and forming open communication from said main storage receptacle to the upper portion of said compartment.

Signed by me this 28th day of April, 1925.

HART H. FLEMING.